United States Patent [19]

Mochizuki

[11] Patent Number: 5,527,179
[45] Date of Patent: Jun. 18, 1996

[54] MOLDING NOZZLE ASSEMBLY FOR PRODUCING HOLLOW CYLINDRICAL SNACK FOODS

[75] Inventor: Keizo Mochizuki, Saitama-ken, Japan

[73] Assignee: Meiji Seika Kaisha, Ltd., Tokyo, Japan

[21] Appl. No.: 393,902

[22] Filed: Feb. 24, 1995

[30] Foreign Application Priority Data

Feb. 24, 1994 [JP] Japan ................... 6-026685

[51] Int. Cl.$^6$ ............................................. B29C 47/20
[52] U.S. Cl. ................ 425/467; 425/380; 425/382.4
[58] Field of Search .................... 425/467, 380, 425/382.4

[56] References Cited

U.S. PATENT DOCUMENTS

| | | | |
|---|---|---|---|
| 3,077,406 | 2/1963 | Benson | 426/242 |
| 3,480,445 | 11/1969 | Slaybaugh | 425/133.1 |
| 4,509,907 | 4/1985 | Ratheiser | 425/380 |

FOREIGN PATENT DOCUMENTS

| | | | |
|---|---|---|---|
| 51-28165 | 3/1976 | Japan | 425/467 |
| 51-76355 | 7/1976 | Japan | 425/382.4 |
| 62-170513 | 7/1987 | Japan | 425/467 |
| 63-71330 | 3/1988 | Japan | 425/380 |

*Primary Examiner*—Robert Davis
*Attorney, Agent, or Firm*—Nikaido Marmelstein Murray & Oram

[57] ABSTRACT

The invention is to improve a molding nozzle assembly for producing hollow cylindrical snack foods. In order to produce hollow cylindrical snack food products of even thickness and the hollow spaces being almost perfectly circular, it includes a nozzle body having a throat, a conical hole converging to the throat and a cylindrical hole extending from the throat. An elongated pin is set in the nozzle passing through the conical hole, throat and cylindrical hole, and a mount is fixed to the nozzle body. The pin has a conical head at one end thereof and a disk collar fixed to the conical head of the pin. The disk collar has circular holes around its center.

2 Claims, 2 Drawing Sheets

MOLDING NOZZLE ASSEMBLY FOR PRODUCING HOLLOW CYLINDRICAL SNACK FOODS

BACKGROUND OF THE INVENTION

1. Field of the Invention

The present invention relates to a molding nozzle device for producing hollow cylindrical snack foods, and more particularly to such a molding nozzle device designed to be mounted to free end of an extruder, which is used in making snack foods from doughs mainly composed of different kinds of pulverized grain, flavorings and the like.

2. Description of Related Art

U.S. Pat. Nos. 3,077,406 and 3,480,445 show methods and apparatuses for making puffed, hollow cylindrical snack foods having two or less percent water content. The method of making star-shaped cereal products according to U.S. Pat. No. 3,077,406 uses an extrusion type nozzle having three support rods to fix an elongated pin at its center, for extruding a cereal dough into a hollow shape whereas the method of making ready-to-eat food products according to U.S. Pat. No. 3,480,445 uses a single-axle extruder having an elongated pin extending from its screw axle to the outside, for extruding a dough into a hollow shape.

When hollow cylindrical ready-to-eat products are loaded with fatty confectionery material such as fatty vanilla cream or fluid chocolate, an injection syringe is used, and then if the circular holes of such hollow cylindrical ready-to-eat products are deformed, or if such cylindrical walls have irregular thickness, the syringe is liable to be caught inside to break or damage the cylindrical walls, thereby causing the leakage of fatty vanilla cream or fluid chocolate from the hollow cylinders. As a consequence production of such cereal or snack foods remains at a reduced efficiency because of relatively large amount of rejected food products.

As for the method of making star-shaped cereal products according to U.S. Pat. No. 3,077,406 the three support rods to fix the pin prevent the dough to flow at even rate in the nozzle, extruding the dough into a triangular-sectioned hollow body. The triangular-section thus formed makes it difficult to insert a cylindrical syringe, often causing the breaking or damaging of such hollow products.

As for the method of making ready-to-eat food products according to U.S. Pat. No. 3,480,445 a single-axle extruder has an elongated pin extending from its screw axle, and if the screw axle should rotate eccentrically, hollow products cannot have even circumferential thickness.

SUMMARY OF THE INVENTION

One object of the present invention is to provide a molding nozzle assembly for producing hollow cylindrical snack foods, designed to be mounted to free end of an extruder, which molding nozzle assembly assures that hollow cylindrical snack foods made thereby have even circumferential thickness, thus guaranteed to be free of leakage of fatty confectionery material from the hollow cylindrical snack foods, which leakage would be caused due to breaking or damaging of such hollow snack foods when loading their hollow spaces with such fatty confectionery material if the circumferential wall thickness is not even.

Another object of the present invention is to provide a molding nozzle assembly which can produce hollow cylindrical snack foods at an increased efficiency because no rejected hollow food products result.

To attain these objects a molding nozzle assembly according to the present invention comprises: a nozzle body having a throat, a conical hole converging to the throat and a cylindrical hole extending from the throat; an elongated pin having a conical head at one end thereof and a disk collar fixed to the conical head of the pin, said disc collar having a plurality of circular holes around its center, said pin passing through the conical hole, throat and cylindrical hole of the nozzle body; and a mount fixed to the nozzle.

The throat is of a circular shape, and its diameter may range from about 5 to 20 mm. The circular shape may be a circle having eight small circular arcs arranged at equiangular distance on its circumference. Each small circular arc may be a part of a circle ranging from about 0.5 to 1.0 mm in diameter.

The disk collar may have seven to nine circular holes around its center, and each circular hole may have a diameter ranging from about 5 to 15 mm. The diameter of the pin shank may range from 5 to 19 mm corresponding to the diameter of the throat, and the pin shank may extend 10 to 100 mm apart from the throat of the nozzle body.

Other objects and advantages of the present invention will be understood from the following description of a molding nozzle assembly according to a preferred embodiment of the present invention, which is shown in accompanying drawings.

DESCRIPTION OF THE PREFERRED EMBODIMENTS

Figure 1:
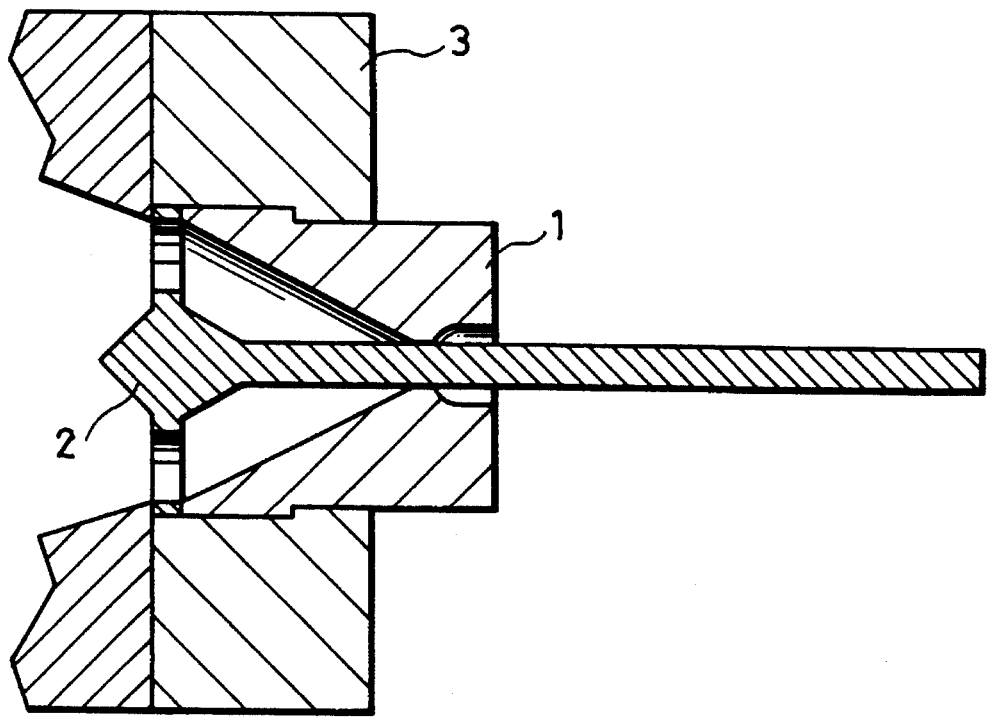
FIG. 1 is a longitudinal section of the molding nozzle assembly.

As shown In FIG. 1, a molding nozzle assembly for producing hollow cylindrical snack foods according to the present invention is designed to be mounted to free end of an extruder, and it comprises a nozzle 1, an elongated pin 2 and a mount 3 fixed to the nozzle 1.

Figure 2:
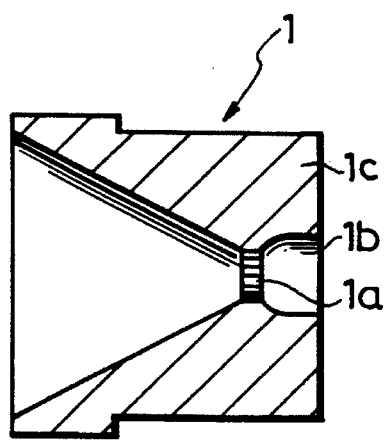
FIG. 2 is a longitudinal section of a nozzle body.
Figure 3:
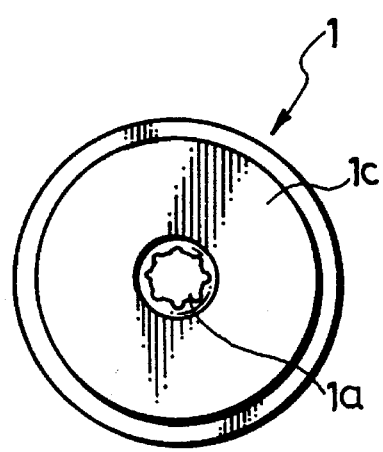
FIG. 3 is a view of the nozzle body as viewed from the side of extruding outlet.

As seen from FIG. 2, the nozzle 1 has a nozzle body 1c forming therein a throat 1a, a conical hole and a cylindrical hole 1b. In the direction in which a dough is extruded the conical hole converges to the throat 1a, and the cylindrical hole 1b extends from the throat 1a.

Figure 4:
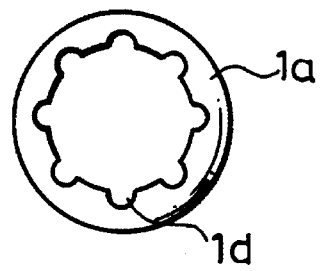
FIG. 4 is an enlarged view of the throat.

As seen from FIG. 4, the throat 1a is of a circular shape. Its diameter ranges from about 5 to 20 mm, and it has eight small circular arcs 1d arranged at equiangular distance on its circumference. Each small circular arc is a part of a circle, the diameter of which ranges from about 0.5 to 1.0 mm.

The shank 2d of the headed pin 2 passes through the throat 1a, leaving an annular gap between the shank 2d and the throat 1a, the size of which annular gap ranges from about 0.5 to 1.0 mm to define the final hollow shape of snack foods.

The conical hole makes the dough to converge to the throat 1a, and then the dough puffs into snack food shapes. The conical hole is defined by the nozzle body 1c and has the controlling effect of making the surface texture of the food products to be thick and dense.

Figure 5:
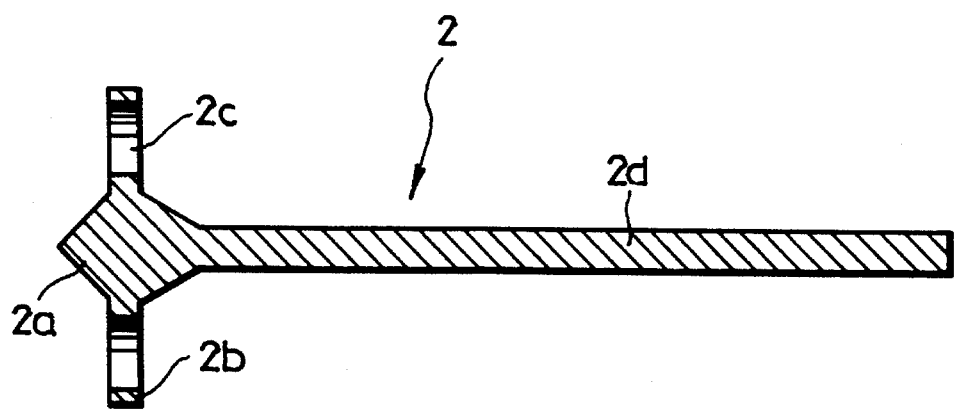
FIG. 5 is a longitudinal section of the headed pin.
Figure 6:
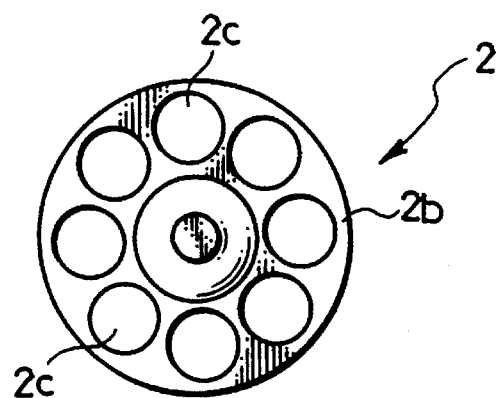
FIG. 6 is a view of the disk collar as viewed from the side of extruding outlet.

As seen from FIG. 5, the headed pin 2 is composed of a conical head 2a, a disk collar 2b and an extended shank 2d. The disk collar 2b has seven to nine circular holes 2c around its center. Preferably the disk collar 2b is 5 to 10 mm thick to permit even distribution of dough. The annular arrangement of circular holes has the effect of making snack food products of even thickness, and the diameter of the circular hole 2c ranges from about 5 to 15 mm.

To permit smooth injection of fatty confectionery material into hollow snack food products with the aid of injection syringes it is necessary to use a pin shank whose diameter is 5 or more mm. Also the diameter of the shank should correspond with the diameter of the above throat 1a so as to keep a gap of 0.5 to 1 mm therebetween as mentioned above. Accordingly, as a result the diameter of the shank 2d ranges from 5 to 19 mm. The nozzle assembly is attached to free end of an extruder by its mount 3, as shown in FIG. 1.

As for the numerical ranges of different parts described above: the shank 2d of the headed pin 2 passes through the throat 1a, leaving an annular gap ranging from about 0.5 to 1.0 mm. If the annular gap is below 0.5 mm, the dough cannot be extruded evenly, and hence hollow cylindrical snack food products cannot have even thickness. If the annular gap is above 1.0 mm, the pressure within the molding nozzle assembly is reduced so that the dough cannot be extruded evenly. Preferably the diameter of the circular hole 2c ranges from about 5 to 15 mm. If the diameter is below 5 mm, the texture of snack food products is liable to be sticky to the teeth. If the diameter is beyond 15 mm, the nozzle size will increase accordingly, and hence the cylindrical hole 1b increases so that the dough may stay there for an extended length of time, thereby causing the scorching of dough.

The number of circular holes 2c is preferably seven to nine. If a disk collar having six or less circular holes 2c, no circular hollow space cannot result. Specifically, if a disk collar having three, four, five or six circular holes 2c is used, a triangular, rectangular, pentagonal or hexagonal hollow space results, and therefore, the injection syringe cannot be inserted easily.

If a disk collar having ten or more circular holes 2c is used, the nozzle size will increase accordingly, as is the case of increasing the size of circular holes 2c. Thus, the dough is liable to stay at the cylindrical hole 1b for an extended length of time, thereby causing the scorching of dough.

Table 1 shows how the number of circular holes 2c, the diameter of circular holes 2c, dispersion or scatter, hollow shape and sensuous estimation are related with each other.

TABLE 1

| number of holes 2c | dia. of holes 2c | scatter | hollow shape | sensuous estimation |
|---|---|---|---|---|
| 3 | 3 | 5 | triangle | 1.5 |
| 3 | 5 | 5 | triangle | 3.0 |
| 3 | 10 | 6 | triangle | 4.0 |
| 4 | 5 | 4 | square | 3.5 |
| 4 | 10 | 4 | square | 4.0 |
| 5 | 10 | 3 | pentagon | 4.0 |
| 6 | 10 | 2 | hexagon | 4.0 |
| 7 | 10 | 1 | almost round | 4.0 |
| 8 | 10 | 0.5 | circle | 5.0 |
| 8 | 15 | 0.4 | circle | 5.0 |
| 9 | 10 | 0.7 | almost round | 3.5 |

TABLE 1-continued

| number of holes 2c | dia. of holes 2c | scatter | hollow shape | sensuous estimation |
|---|---|---|---|---|
| 10 | 15 | 1.5 | deformed | 2.0 |

(dia. of holes 2c and "scatter" given in mm.)

The "scatter" is given in terms of the difference between the maximum thickness and the minimum thickness of the circumference wall of each hollow cylindrical snack food product.

The sensuous estimation of the snack food texture was made by experts according to the following sensuous estimation criteria:

| marks | estimation criteria |
|---|---|
| 1 | unpleasing feeling when eating; a scratching sound produced; and texture being sticky to the teeth. |
| 2 | less pleasing feeling when eating. |
| 3 | good feeling when eating. |
| 4 | pleasing feeling when eating. |
| 5 | very pleasing feeling when eating, eating crisp. |

As seen from Table 1, the number of circular holes 2c and the diameter of circular hole 2c have a great influence on the dispersion or scatter of the thickness of hollow cylindrical snack food products and on the hollow shapes.

The hollow shapes of snack food products produced by using disk collars having six or less circular holes 2c are like polygons having as many as the circular holes 2c, as for examples follows: the hollow shapes produced by using disk collars having four and six circular holes are rectangular and hexagonal respectively. The hollow shapes produced by using disk collars having seven to nine circular holes are almost circular. Also, the dispersion or scatter of the thickness of hollow cylindrical snack food products is decreased by using disk collars having seven to nine circular holes.

The disc collar 2b whose thickness ranges from 5 to 10 mm has a good resistance to the flow of dough, thereby causing the effect of keeping the dough passing through the disc collar at a fixed flow rate. For unknown reasons the disc collar 2b whose thickness is below 5 mm cannot distribute the dough evenly whereas the disc collar 2b whose thickness is beyond 10 mm is liable to cause excessive cooking because of increased resistance to the passing of dough through its circular holes.

The pin shank 2d forms a hollow space in a snack food product, defining the diameter of the hollow cylindrical space. The pin shank 2d must be five or more mm in diameter for permitting smooth insertion of an injection syringe, which is four or more mm in diameter. Also the pin shank 2d extends 10 to 100 mm from the throat 1a so that hollow shapes may be formed exactly.

In use a nozzle according to the present invention is attached to an extruder. A dough made of grain flour, starch and flavorings is extruded into hollow cylindrical food products. Such a dough may be prepared from rice, wheat or rye flour, cornstarch, potatostarch or any other starch, sugar, salt, amino acid or any other flavoring, and spices. Such ingredients are mixed by a single- or double-axle mixer, and the mixture is put in the extruder while water is being added to the mixture by 5 to 15 percent by weight, and the dough is subjected to cooking. The dough is liable to be heated excessively in cooking if its water content is below 5 percent by weight, and the snack food products are sticky to the teeth, and their texture is unsatisfactory.

If water is added to the mixture by more than 15 percent by weight, the dough cannot be puffed because of too much water content. As an extruder a trapezoid screw type of double-axle extruder or a lens, paddle type of double-axle extruder may preferably be used.

The barrel of the extruder is kept at the temperature of 150 to 200 degrees C., and the circumferential speed of the screw rotation is controlled to be equal to 15 to 20 m/min. If the barrel temperature is below 150 degrees C., the cooking of dough will be unsatisfactory, and the hard texture will result. If the barrel temperature is above 200 degrees C., the excessive cooking of dough will be caused, and the snack food products are liable to be sticky to the teeth.

Elongated hollow cylindrical snack food products whose water content is about 8 percent are cut appropriate length, and hollow cylindrical snack food products of relatively short length are reshaped and dried until their water content is below 2 or less percent. Finally the hollow snack food products are filled with fatty confectionery material by using injection syringes. The hollow cylindrical snack food products prepared by using a nozzle assembly according to the present invention have a real circular hollow space, thereby permitting the smooth insertion of an injection syringe in the hollow space of the snack food product without fear of damaging or breaking.

Some examples of producing snack foods by using a nozzle assembly according to the present invention are described below.

A nozzle assembly comprising a nozzle 1, an elongated pin 2 and a mount 3 was attached to a BC45 double-axle extruder produced by CLEXTER. The throat 1a was 8 mm in diameter with eight small circular arcs 1d of one milimeter-long radius positioned at eight equiangular distances.

The disc collar 2b had eight circular holes 2c, the diameter of which circular holes was 11 mm, and the diameter of the pin shank was 7 mm. The pin shank extended 100 mm from the throat 1a. The nozzle assembly was attached to free end of the barrel covering the screw of BC45 double-axle extruder.

A dough was prepared by mixing wheat flour of 40 percent by weight, rye flour of 30 percent by weight, rice flour of 20 percent by weight, cornstarch of 5 percent by weight, sugar of 4 percent by weight and salt of 1 percent by weight, and adding water to the so prepared mixture by 20 percent by weight.

The mixture was put in the extruder at the rate of 50 kg/hour, and was rotated 180 r.p.m., and was cooked at the temperature of 170 degrees C. The hollow snack food product ran from the extruder at the rate of 50 m/min., and it was cut 10 cm in length. These pieces of snack food were dried until their water content was 1.0 percent.

Pieces of snack food product were found to have substantially even thickness (0.4 millimeter-thick dispersion or scatter). An injection syringe having a diameter of six millimeter was used to fill hollow snack food pieces with fatty confectionery material. No hollow snack food pieces were damaged or broken when loaded with fatty confectionery material, and were rejected.

As may be apparent from the above, a nozzle assembly according to the present invention can produce hollow cylindrical snack food products of even thickness, the hollow spaces of which are almost perfectly circular, thus assuring the smooth insertion of an injection syringe in the hollow space.

I claim:

1. A molding nozzle assembly for producing hollow cylindrical snack foods, designed to be mounted to a free end of an extruder, comprising:

a nozzle body having a throat, a conical hole converging to the throat and a cylindrical hole extending from the throat;

an elongated pin having a conical head at one end thereof and a disk collar fixed to the conical head of the pin, said disk collar having a plurality of circular holes around its center, said pin passing through the conical hole, throat and cylindrical hole of said nozzle body;

a mount fixed to said nozzle body; and;

wherein said throat is of a circular shape, and has a diameter ranging from about 5 to 20 mm; and said throat is a circle aperture having eight small circular arcs arranged at equiangular distance on its circumference, each of said small circular arcs being a part of a circle having a diameter ranging from about 0.5 to 1.0 mm.

2. A molding nozzle assembly for producing hollow cylindrical snack foods, designed to be mounted to a free end of an extruder, comprising:

a nozzle body having a throat, a conical hole converging to the throat and a cylindrical hole extending from the throat;

an elongated pin having a conical head at one end thereof and a disk collar fixed to the conical head of the pin, said disk collar having a plurality of circular holes around its center, said pin passing through the conical hole, throat and cylindrical hole of said nozzle body;

a mount fixed to said nozzle body; and wherein said disk collar has seven to nine circular holes around its center, each circular hole having a diameter ranging from about 5 to 15 mm; a pin shank having a diameter ranging from about 5 to 19 mm corresponding to the diameter of the throat, and the pin shank extends 10 to 100 mm apart from the throat of the nozzle body.

\* \* \* \* \*